Figures 1, 2:
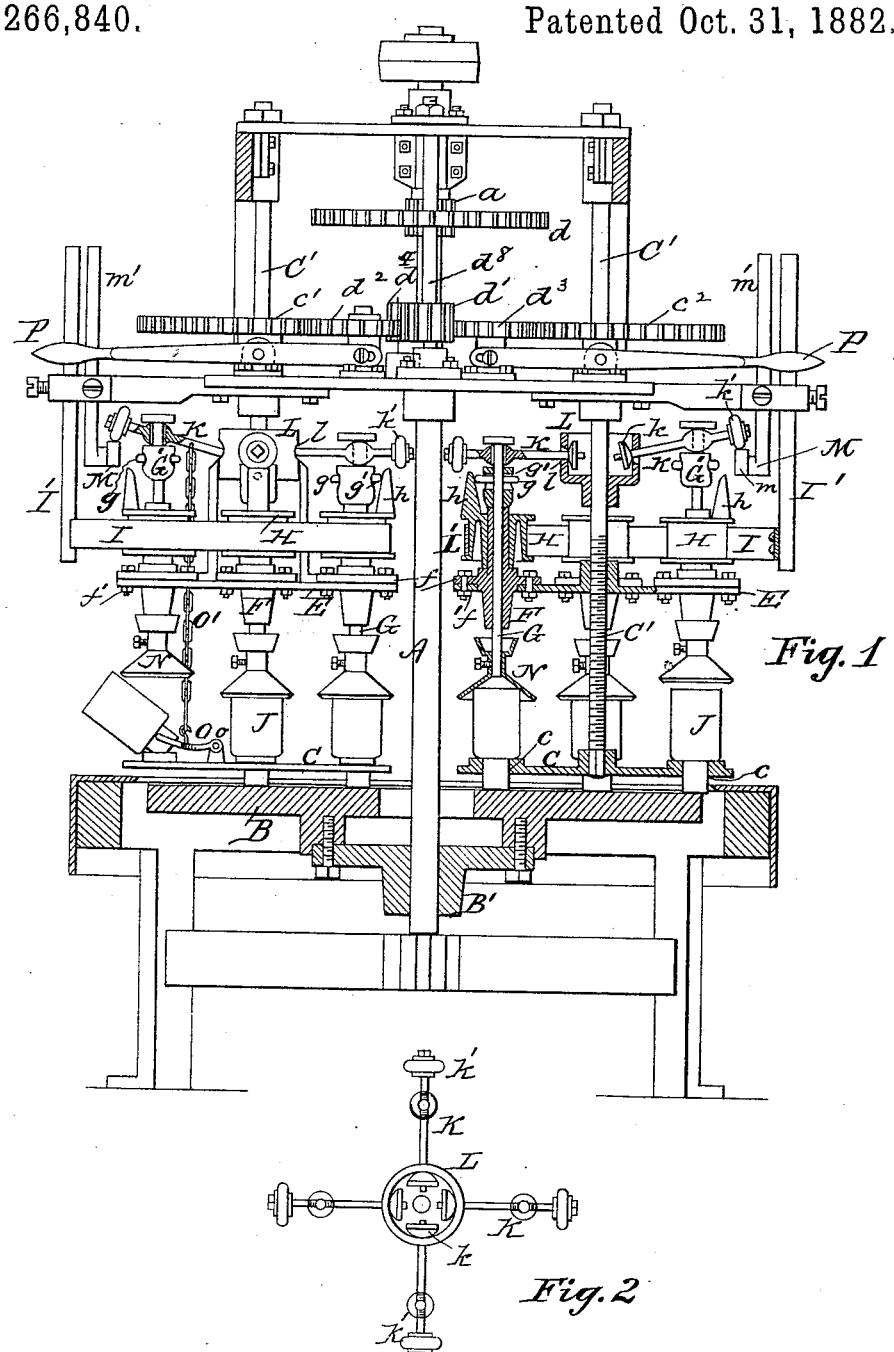

(No Model.) 2 Sheets—Sheet 1.

A. W. KELLY.
GLASS GRINDING MACHINE.

No. 266,840. Patented Oct. 31, 1882.

WITNESSES:
S. J. VanStavoren
J. L. Jones

INVENTOR,
Alex W. Kelly
By Connolly Bros.,
ATTORNEYS.

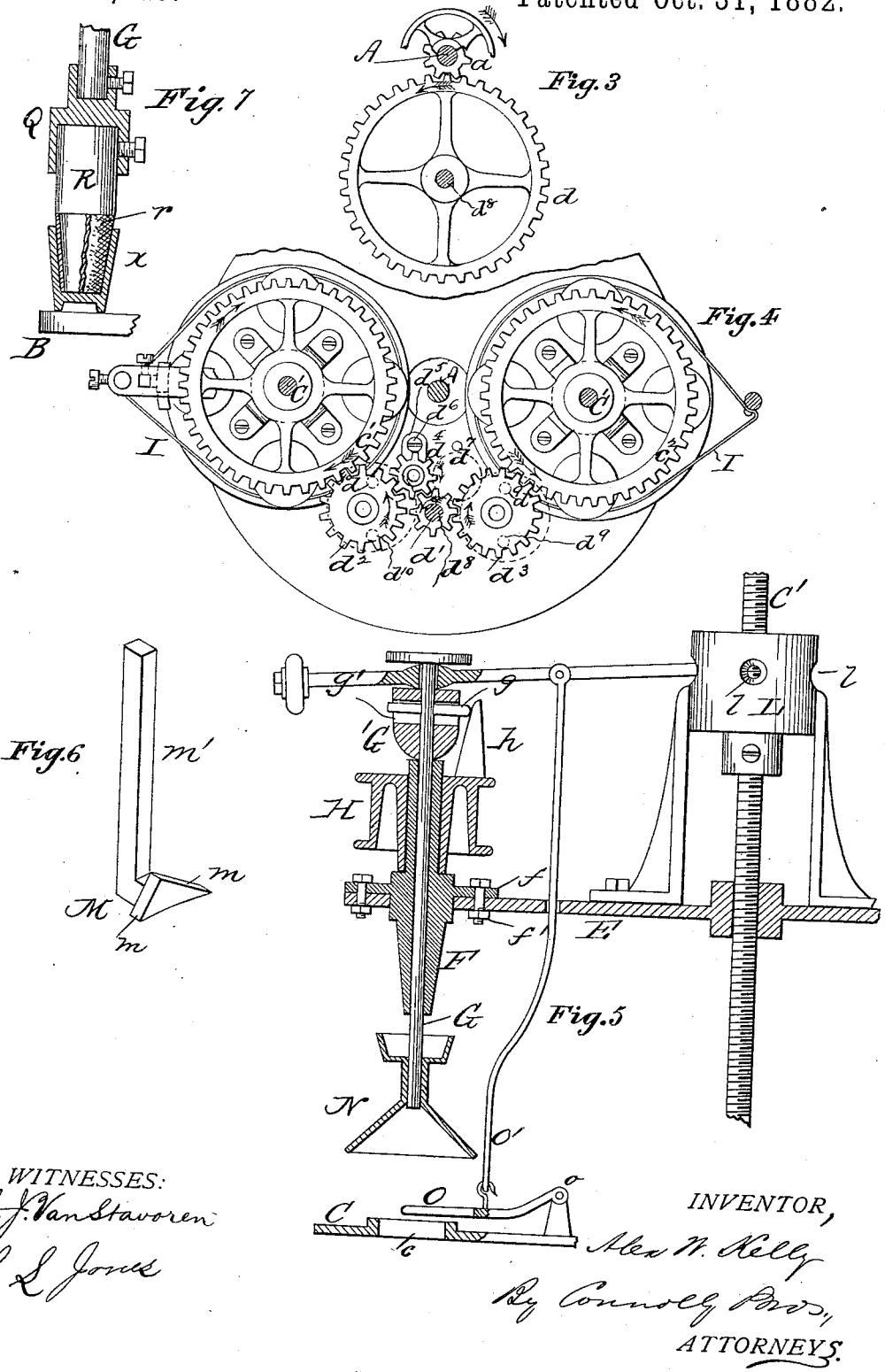

UNITED STATES PATENT OFFICE.

ALEXANDER W. KELLY, OF PHILADELPHIA, PENNSYLVANIA.

GLASS-GRINDING MACHINE.

SPECIFICATION forming part of Letters Patent No. 266,840, dated October 31, 1882.

Application filed February 25, 1882. (No model.)

*To all whom it may concern:*

Be it known that I, ALEXANDER W. KELLY, a citizen of the United States, residing at Philadelphia, in the county of Philadelphia and State of Pennsylvania, have invented certain new and useful Improvements in Glass-Grinding Machines; and I do hereby declare the following to be a full, clear, and exact description of the invention, reference being had to the accompanying drawings, which form part of this specification, and in which—

Figure 1 is a vertical section, partly in elevation, of a grinding-machine embodying my invention. Figs. 2, 3, and 4 are detail plans. Fig. 5 is a detail section drawn to an enlarged scale. Fig. 6 is a detail perspective, and Fig. 7 is a section of a detail modification.

My invention has relation to the machine for which Letters Patent of the United States, dated December 29, 1869, No. 98,270, were granted to myself and John B. Samuel; and my improvements have for their object to provide means whereby the jars, after being ground, will be by an automatic action released from the clamping or holding device and tilted into a position where they can be readily grasped and removed by the attendant, thereby relieving the latter of the work hitherto imposed on him of raising such clamp by his own exertions.

My improvements have for their further object to provide a construction which will permit the machine to have its directions of rotation reversed—*i. e.*, to make it either a right or left hand machine.

My improvements consist in the peculiar construction and combination of parts hereinafter fully set forth.

Referring to the accompanying drawings, A designates the main shaft, to which is secured the grinding-disk B, the hub B' of said disk being keyed or otherwise fastened on said shaft.

C C are carrier-disks, having openings $c$ $c$ for the necks of jars J J or other vessels which require to be ground. Said carriers are mounted on shafts C' C', having cog-wheels $c'$ $c^2$, in gear with a driving-wheel or pinion, $a$, on the main shaft A, through the medium of intermediate wheels, $d$ $d'$ $d^2$ $d^3$ $d^4$. The wheel $d^4$ is an idler, and, as shown, is interposed between the wheels $d'$ $d^2$, so arranged that the shafts C' C' will turn in opposite directions, as shown by the arrow, Fig. 4. If it be desired to reverse the motion of the shafts C' C', the bracket $d^5$ is shifted, so that the screw $d^6$, by which it is held, will enter the opening $d^7$. The wheels $d^2$ $d^3$, with their brackets, are also moved across the machine to occupy the positions shown in dotted lines, the screws which hold their brackets entering the holes $d^9$ $d^{10}$. This brings the idler $d^4$ between the wheels $d'$ $d^3$, as shown in dotted lines, Fig. 6, so that now both shafts C' C' will turn in the direction opposite to that indicated by the arrows. The shafts C' C' have clamp-plates E E secured thereto, so as to rotate therewith, said clamp-plates having openings in which are secured hubs F F, formed with annular flanges $f$ $f$, through which pass fastening-bolts $f'$ $f'$. The hubs F F form bearings for vertical shafts G G, fitted easily, so as to be free to rotate on their longitudinal axes and to move lengthwise in such hubs, as hereinafter set forth. On said hubs are pulleys H H, which are encircled, as shown, by an endless belt, I, secured to a lever or bar, I'. As the shafts C' C' rotate, carrying with them the plates E and pulleys H, the latter rotate each on its own axis, by reason of frictional contact with belt I, as well as describe an annular movement around the shafts C' C'. The pulleys H H are each formed or provided with an upwardly-projecting finger, $h$, and the shafts G G have cross-pieces $g$ $g$, which rest, as shown, on or against said finger $h$, whereby as said pulleys rotate the shafts $g$ $g$ move therewith.

Above the cross-pieces $g$ are rocking bars K K, secured to the shafts G G, and arranged to rest normally in a horizontal position, yet capable of being tilted to assume an inclination. The inner ends of these bars pass through openings $l$ $l$ in the walls of caps L, which are firmly secured to the shafts C' C', and provided with nuts $k$ $k$. Their outer extremities carry anti-friction rollers $k'$ $k'$. M are cams having double inclines $m$ $m$, said cams being secured by bars $m'$ to the frame of the machine, so as to be in the path of the rollers $k'$ $k'$ as the latter move around with the shafts C' C'. As the rollers $k'$ $k'$ move up on the cams M the bars K are thereby tilted, thus lifting the vertical shafts G G. On the lower ends of shafts G G are clamp-sockets N N, which, when said shafts are down in their normal position, hold the jars J against the grinding-disk B. When the shafts G are raised, as described, the clamp-sockets rise away from the jars, leaving the latter free for removal. By the means described, when the jars are being ground they have a double rotation—i. e., a rotation on their individual axes and an annular movement around the grinding-disk. This compound movement causes them to be ground more uniformly than if they had an annular movement only, and avoids the production of lines on their ground edges.

O O are forks, pivoted at o on the carrier-disks C C, so that their arms encircle the neck of jars passing through the openings c in said disks and pass below the shoulders of such jars. These forks are each connected by a chain or link, O', with the bars or rods K, or are otherwise suitably connected with the shafts G, so as to move therewith as the latter are lifted. When such lifting occurs the forks are elevated at their outer extremities, tilting the jars, as shown in the left of Fig. 1, thus enabling the attendant to readily remove the same and replace with others. It will of course be understood that only one shaft G in a clamp-plate will be lifted and only one corresponding fork be moving therewith at one time—that is, that as each roller $k'$ passes a cam M a shaft G will be lifted and a jar released and tilted or thrown out, and that as the rollers $k'$ follow each other in the same path the ground jars are thus moved or thrown out successively and not simultaneously. The machine illustrated being a double one, or showing two sets of carriers and two cams, M M, two jars may be simultaneously moved.

P P are levers connected with the brackets of the wheels $d^2$ $d^3$, whereby the latter can be lifted out of engagement when it is desired to stop the machine. Said levers are fulcrumed or pivoted in any suitable manner on the frame of the machine, as shown at p, and form practically clutch-levers for lifting the gear-wheels or pinions out of engagement with their drivers.

To prevent the pin g from being loosened or broken by contact with the upper end of the sleeve F when the spindle G descends, said pin is protected by a loose collar, G', on said spindle. This collar has a slot, $g'$, in which said pin has play-space. When the spindle rises the pin traverses this slot vertically, and when the spindle falls the collar meets the upper end of the sleeve, and so protects the pin from meeting said sleeve.

To provide for grinding the bottoms of tumblers, jelly-glasses, and other small articles, a cylindrical socket, Q, is substituted for the flaring or conical holder N. In this socket is placed a wooden block, R, projecting below the lower edge of the latter, covered with rubber, as shown at r, and holding and entering the article X while being ground.

What I claim as my invention is as follows:

1. The combination, in a machine for grinding glass jars or other articles, of a vertical rotating shaft having a clamp or holding socket for such jars or articles, and means, substantially as described, for automatically lifting such shaft to release the jar or other article, as set forth.

2. The combination, in a machine for grinding glass jars or other articles, having a vertical shaft, with a clamp or socket for holding such jars or articles and a disk or carrier in which the jars or other articles rest while being ground, of means, substantially as described, for tilting such jars or other articles on the carrier when the clamp-shaft is raised, as set forth.

3. The combination, in a machine for grinding glass jars or other articles, of vertically-movable shaft G, having cross-piece g, with pulley H, having upwardly-projecting finger h, substantially as shown and described.

4. The combination, with shaft C' and cup L, of vertically-moving and rotating shafts G, rocking arms K, and cam or incline M, substantially as shown and described.

5. The combination, with vertically-moving shaft G and disk or carrier C, of fork O, connected with said shaft by means of link O' and bar K, whereby as the latter is lifted the fork will be raised, as and for the purpose set forth.

6. In a machine for grinding glass jars or other articles, the combination, with center shaft, A, having pinion or gear wheel a, of shafts C' C', having gear-wheels $c'$ $c^2$, pinions d d', intermediate shifting-wheels, $d^2$ $d^3$, and adjustable idler $d^4$, whereby both said shafts may be adjusted to turn either to the right or left, substantially as shown and described.

7. In combination with the sleeve F, sliding spindle G, and pin g, the loose collar G', having slot $g'$, substantially as shown and described.

In testimony that I claim the foregoing I have hereunto set my hand this 24th day of February, 1882.

ALEXANDER W. KELLY.

Witnesses:
S. J. VAN STAVOREN,
CHAS. F. VAN HORN.